United States Patent [19]
Harold

[11] 3,994,523
[45] Nov. 30, 1976

[54] VEHICLE TRANSPORT TRAILER
[76] Inventor: Billy E. Harold, 6869 Oldham, Taylor, Mich. 48180
[22] Filed: June 25, 1975
[21] Appl. No.: 590,196

Related U.S. Application Data
[63] Continuation of Ser. No. 452,237, March 18, 1974.

[52] U.S. Cl. .............................. 296/1 A; 105/368 R
[51] Int. Cl.² ........................................... B60P 3/08
[58] Field of Search ................. 296/1 A; 105/368 R

[56] References Cited
UNITED STATES PATENTS

| | | | |
|---|---|---|---|
| 3,104,127 | 9/1963 | Swartzwelder ..................... | 296/1 A |
| 3,343,865 | 9/1967 | Stuart ................................. | 296/1 A |
| 3,589,767 | 6/1971 | Stuart ................................. | 296/1 A |
| 3,690,717 | 9/1972 | Taylor ................................. | 296/1 A |

*Primary Examiner*—Robert R. Song
*Attorney, Agent, or Firm*—Harry R. Dumont

[57] ABSTRACT

A vehicle transport trailer including a low bed trailer capable of transporting a load of six full-sized sedans, a load of six pick-up trucks, a mixed load of vans and full-sized sedans, and further mixed loads of pick-up trucks, vans, compact sedans and other vehicles. The vehicle transport trailer in one embodiment relates to a load carried entirely within the limits and confines of a trailer structure without requiring storage of any vehicle on or above the tractor drawing the trailer. An optional embodiment includes the combination of a trailer constructed in accordance with the present invention, and further including an above the tractor cab arrangement for an additional vehicle. These referred to load arrangements are made possible by particular track and elevating mechanism arrangements and in some cases by a particular orientation of the vehicles with a loading sequence related to their relative position on the trailer.

9 Claims, 12 Drawing Figures

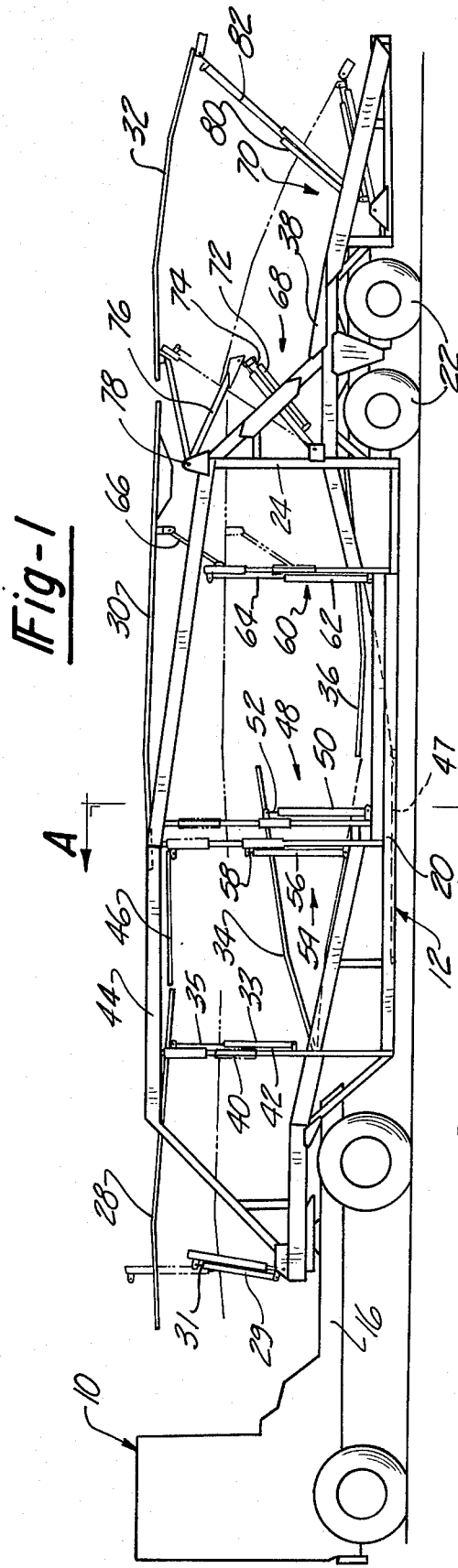

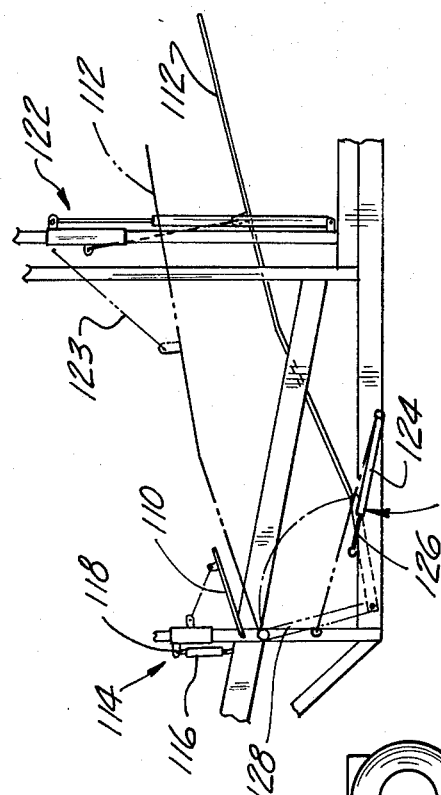
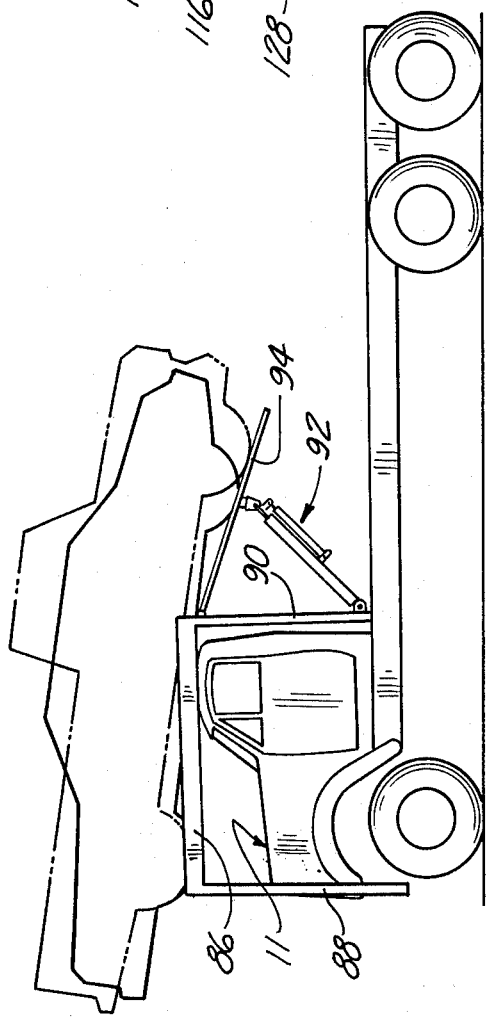
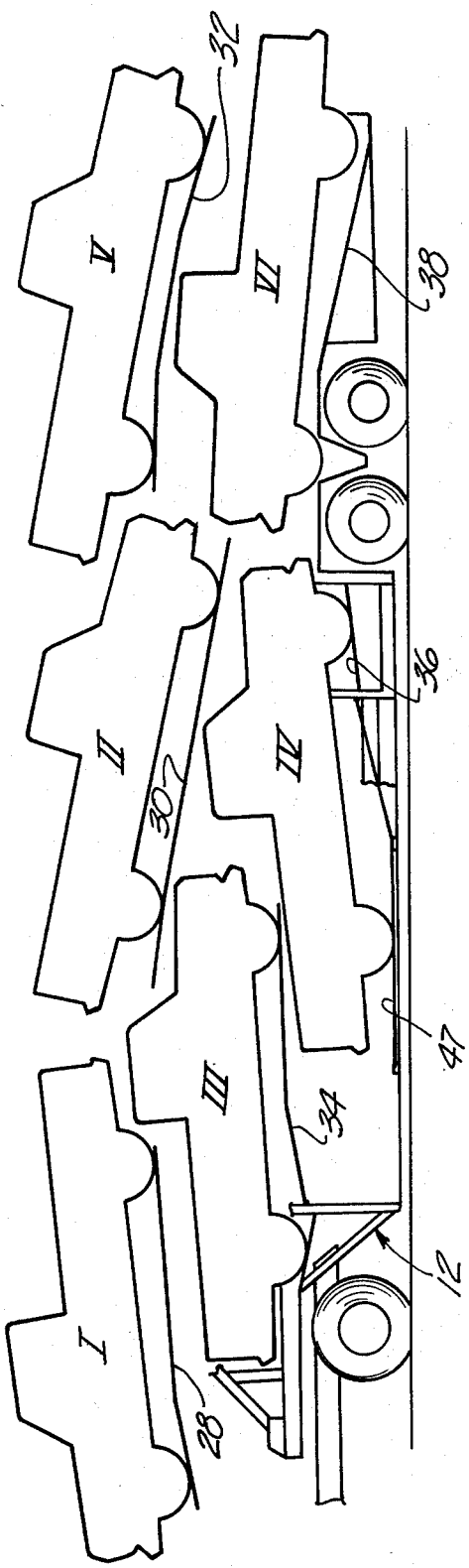

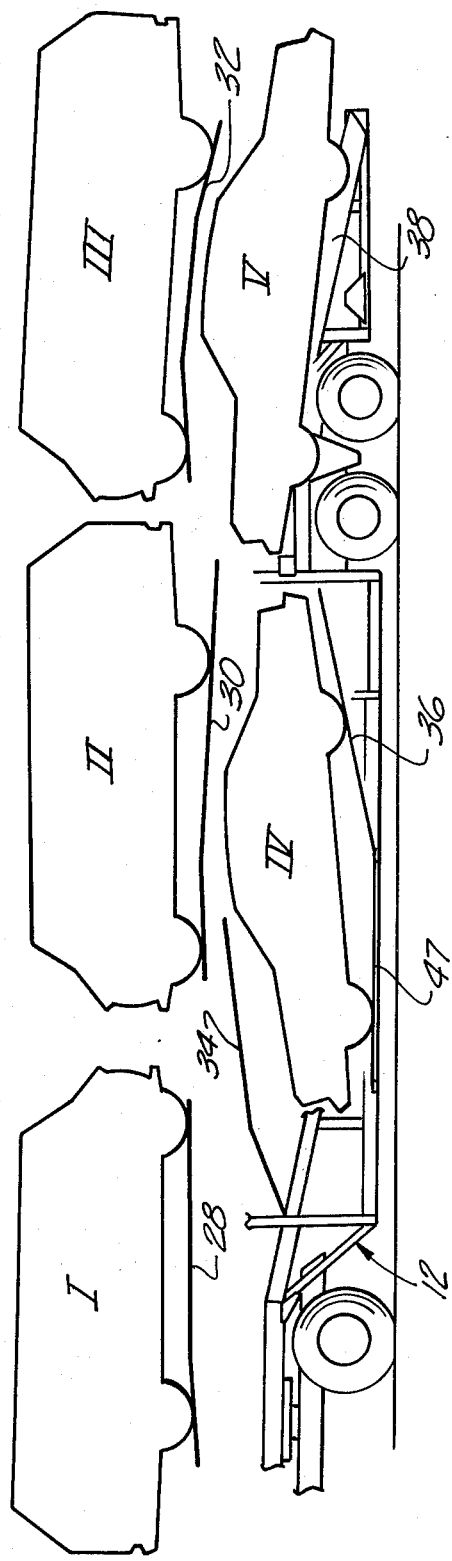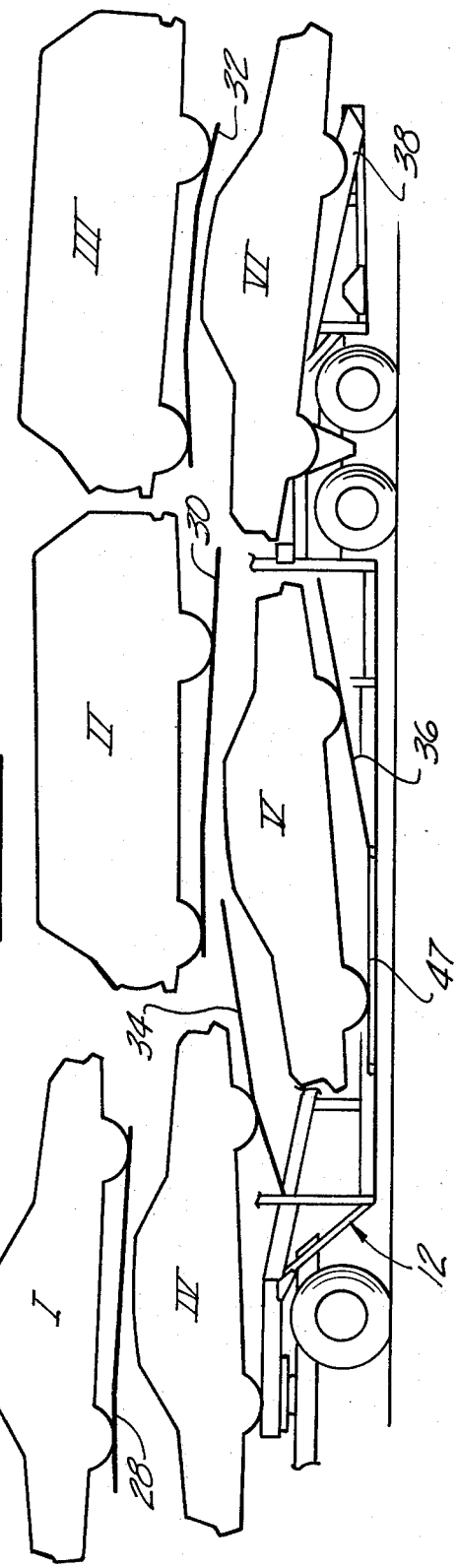

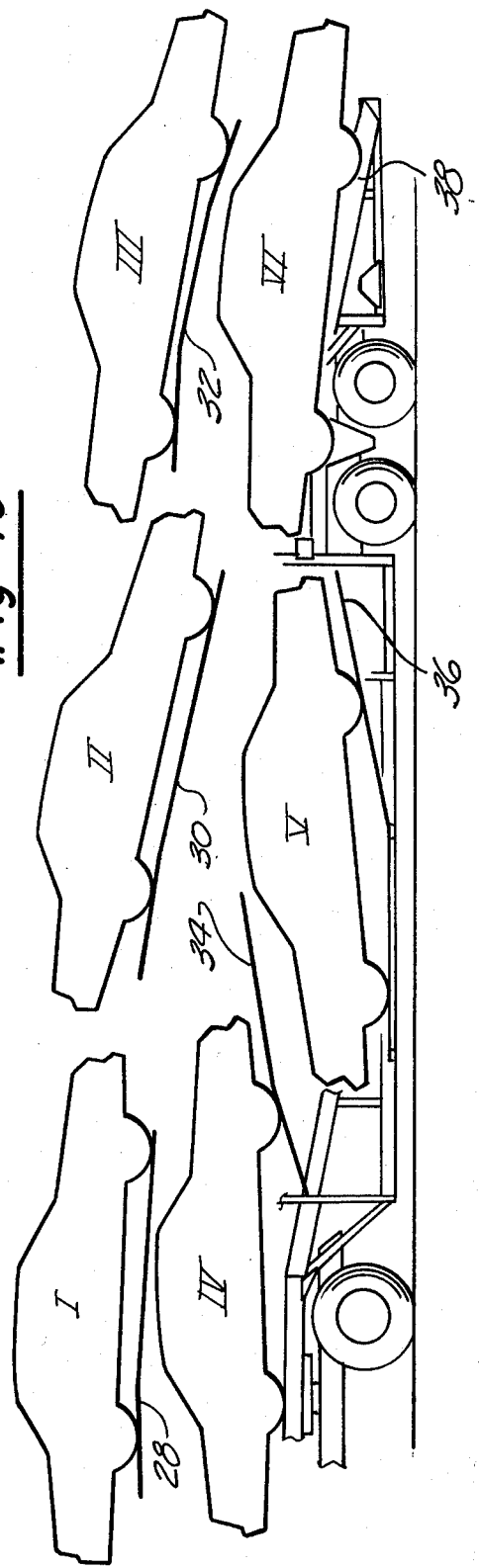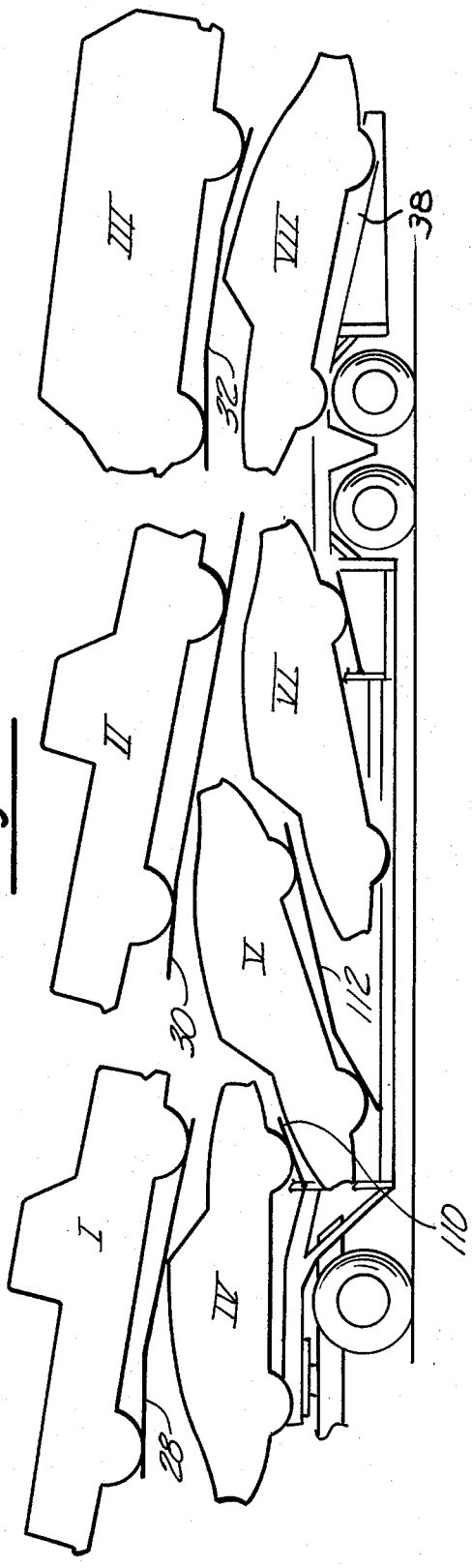

VEHICLE TRANSPORT TRAILER

REFERENCE TO RELATED APPLICATION

This application is a continuation of my pending application Ser. No. 452,237, filed Mar. 18, 1974 for "Vehicle Transport Trailer".

BACKGROUND OF THE INVENTION

This invention relates to a vehicle transport trailer and more particularly to a tractor-trailer unit capable of hauling six full-sized sedans or six pick-up trucks and a variety of combinations of mixes of different vehicle loadings without the need for loading an additional vehicle over the cab. The present invention makes it possible to use a relatively short high-tilt cab in conjunction with a trailer having a maximum length of no more than forty-five feet so as to conform with the most stringent of the various state laws which provide maximum length and height limitations for transport vehicles, particularly vehicles used for hauling motor vehicles. In many states, a loaded trailer may not exceed 55 feet plus 5 feet overhang of 60 feet in length and 13½ feet in height. A limitation on the loading is that with high power diesel engine tractors the tractor cab is frequently of a height which prevents a loading of a pick-up truck or van, for example, over the tractor cab.

An advantage of the present invention, as it will be explained in detail hereinafter, is that it greatly improves the safety factor with respect to enlarging the driver's field of vision, since in the higher cab he is enabled to see farther in all directions of traffic. It is possible through one embodiment of the present invention to provide a loading of vehicles without need for the support frame and cross member at the front of the tractor cab.

A still further advantage of the present invention is that in the preferred embodiment in which the trailer contains all of the carried vehicles it is possible to use a standard high-tilt tractor which can be switched from trailer to trailer independently of the particular vehicle trailer being towed.

A variety of vehicle transports are in current commercial use, most of which are subject to certain obvious shortcomings and disadvantages. An example of one such vehicle transport is shown and described in Stuart U.S. Pat. No. 3,589,767. The vehicle transport there described is typical of many transports on the road, in that one of the vehicles being transported is being carried on the forward ramp over the cab thus limiting the size and power of the truck tractor used to haul the equipment. Safety problems are likewise caused by impeding the vision of the driver through such a support frame associated with the tractor as has already been discussed.

With the vehicle transport trailer of the present invention it is possible to use a standard high-tilt cab. The trailer is itself self-contained so that trailers may be exchanged with loads and the extensive cost of modifying a standard tractor and installing the forward ramp is not necessary. The vehicle transport according to my invention is thus usable with any of a variety of commercial tractors. The further advantage from the present invention arises from the use of the transport with a tractor which need not be in any way modified so that it may be used for a trade-in at the end of each model year. A standard tractor that has been certified by the manufacturer as conforming with federal requirements likewise need not be modified with respect to exhaust systems, or other systems.

A different vehicle transport system is shown and described in Stuart U.S. Pat. No. 3,343,865. This transport has similar problems with respect to requiring the loading and storage of a vehicle over the tractor cab and again requires an extension of the forward ramp and the costly modification of a standard tractor by incorporating that ramp.

A still further vehicle transport is shown and described in Taylor U.S. Pat. No. 3,690,717 which in a manner similar to the first mentioned patent requires storage of a transported vehicle over a custom modified tractor.

SUMMARY OF THE PRESENT INVENTION

The present invention thus relates to a vehicle transport trailer which is adaptable to be towed by any standard type tractor, having three tracks aligned along the top of the trailer which are adjustable at either end vertically and this permits loading with a maximum number of vehicles in the backed-on position. This feature is of advantage since unloading is frequently done at night and the unloading process is facilitated when the vehicle can be driven off from a forward facing position so that the headlights may be used. The present invention further provides an arrangement of track in which the front upper and second lower tracks have mounted therebetween the front lower track in overlapping position to facilitate the high capacity and versatility of loading which characterizes the present invention. A further feature is provided through the tilting apparatus at the front and the rear track ends which facilitates loading of a great variety of mixed loads and in each case allows for loads of commercial vehicles, such as pick-up trucks or vans, with height requirements maintained well within the applicable limits of state laws. In one modified form of the invention, there is illustrated an optional arrangement whereby a still further vehicle can be carried over the cab.

BRIEF DESCRIPTION OF THE DRAWINGS

A complete explanation of the present invention will be provided with reference to the accompanying specification and to the several drawings in which like parts are identified with like numerals where they appear in the several views, and wherein:

FIG. 1 is a side elevational view of a vehicle transport trailer incorporating the preferred features of the invention;

FIG. 2 is a vertical cross section along the section line A—A of FIG. 1;

FIG. 3 is an enlarged detail section along the section line B—B of FIG. 2;

FIG. 4 is a fragmentary top plan view partially in section along the line C—C of FIG. 2 showing the detail of construction of a part of the track;

FIG. 5 is a perspective view showing a portion of the track elevating mechanism;

FIG. 6 is a side elevational view of a modification of the present invention showing particularly an additional loading possible above a suitably modified tractor cab;

FIGS. 7 through 11 are side elevational views illustrating a number of types of loading of both commercial and passenger vehicles; and FIG. 12 is a side elevational view of an optional construction for the forward portion of the lower track showing it in its upper loading and lowermost loaded position to provide the mixed load.

DETAILED DESCRIPTION

The vehicle transport or carrier of the present invention is shown in its entirety in FIG. 1 and comprises a conventional tractor 10 of the tilt cab type and a trailer 12. The tractor 10 has a main frame 16 on which there is supported the forward end of the trailer 12. It will be seen that the trailer 12 is adapted to be hauled by any type tractor, either high or low cab type. The trailer 12 has a main frame 20 of the low bed or drop center type, the rear end of which is supported by wheels 22 and the forward end of which is supported on the tractor 10 through a conventional kingpin hook-up mechanism. The trailer frame 20 supports a super-structure which includes relatively spaced like vertical side members 24, each being fabricated from rigid structural members and connected in a common vertical plane to form a truss-like load supporting structure of substantial vertical height. The relatively spaced side members 24 are interconnected at the bottom to the main frame 20 of the trailer. The trailer 12 includes at least six different and separate tracks, certain of which are movable in predetermined manners to provide a versatility of loading and of vehicle load mix not previously possible with a vehicle transport system. In each case, the movable tracks are shown in their lowermost position in dash line form and in the uppermost position in solid line form. The upper three tracks are denoted by the numerals 28, 30 and 32. The lower three tracks are indicated generally by the numerals 34, 36 and 38. The portion 47 forms an extension of track 36 when the track 36 is in a lowered position. It will be understood that the forward portion 47 of track 36 rests in the bed of the trailer 12 and the track 38 likewise is formed as a part of the trailer 12 bed. The rearward portion of the track 36 is pivotally movable between the upper loading and the lower dash line loaded position.

The movement of the upper three tracks 28, 30 and 32 is generally vertical and is accomplished through a hydraulic or pneumatic elevating mechanism which includes, with respect to track 28, a forward cylinder 29 and a piston rod 31. A second cylinder 33 and piston rod 35 are connected to the rearward end of the track 28, while the two side track portions are laterally supported and connected in a manner which will be better shown in FIG. 2 hereinafter. Responsive to the operation of the two above mentioned cylinder and piston combinations, the track 28 will be moved slidably upward. This upward movement will provide slidable motion of a pair of sleeves 40, each of which is slidably mounted and journalled about a vertical post 42 forming a part of the super-structure of the trailer 12. Each post 42 is fixed at its upper end to a frame member 44 and its lower end to the base 45 of the trailer 12. In each case the opposed pairs of sleeves 40 are laterally connected through a beam 43 which in turn carries the two side tracks forming the unitary track 28.

It will be understood that during the loading process it is necessary to temporarily position skids, such as skids 46 shown in FIG. 1, intermediate the upper tracks 28 and 30 or between the rearward end of track 32 and the ground so that the vehicles may be loaded.

It will be seen that the forwardmost lower track 34 is pivotably supported at its forward end and movable in a pivotable fashion through the operation of an associated elevating mechanism 48, which includes a cylinder 50 and a piston rod 52. During the loading of the forwardmost lower vehicle, the track 34 is held in its lowered or dash line position. Then it is elevated in its upper solid line position once the vehicle is loaded as is better shown, for example, in FIG. 7 in the pick-up truck loading. The next upper track 30 is similarly elevatable through its respective elevating mechanism 54, which includes a cylinder 56 and a piston rod 58. In the similar cross-bar or beam arrangement, both side sections of the track 34 are movable to the upper solid line designated position. The rearward end of the track 30 is likewise supported for vertical movement responsive to the actuation of an elevating mechanism 60, which again includes a cylinder 62 and a piston rod 64. In this case the piston rod 64 is connected through a link 66 to the track 30.

With respect to the upper rearward track 32, the mechanism used to elevate it is somewhat more complicated. The movement of the rearwardmost track 32 may be described as both pivotable about its left hand or forward end and as a movement of translation between the lower and upper elevated position. This movement again is provided through a pair of elevating mechanisms 68 at the forward end of the track 32 and elevating mechanism 70 connected to the rearward end of the track 32. The elevating mechanism 68 includes a cylinder 72 and a piston rod 74 connected through a link 76 to a central pivotal point formed in the side frame 24 and denoted by the numeral 78. Thus, during the upward movement of the track 32, there is available a movement of translation as well as a pivotal movement, with the pivotal movement being caused primarily by the operation of the elevating mechanism 70 and the operation of its associated cylinder 80 and piston rod 82.

FIG. 6 shows a modification of a standard tractor 11 of the low cab type, with the inclusion of a stationary forward ramp or track 86, supported by vertical support members 88 and 90 which are suitably fastened to the forward end of the tractor 11 and to the truck bed at the rear of the tractor cab. A suitable elevating mechanism 92 of the pneumatic or hydraulic type is used to control the movement of a relatively short rearward track section 94 to allow for the loading of an additional vehicle, such as a full-sized passenger car or pick-up truck as illustrated in FIG. 6. This particular load arrangement indicates a further extension of the present invention through the use of a modified tractor in conjunction with the self-contained vehicle carrier trailer 12 as has already been shown, particularly in FIG. 1. This represents a further possible extension of the improved load bearing capability of my trailer transport.

One of the major advantages of the present invention has been its adaptability to handle relatively large height commercial vehicles, such as pick-up trucks and vans, and further to make possible a mixed load of such commercial trucks along with passenger vehicles such as full-sized sedans, intermediate cars, or compact cars, so that the fullest use can be made of the vehicle bearing capacity of the equipment.

In order to clarify the terminology with respect to the vehicles to which the invention is applicable, the following is a listing of vehicles with an approximate maximum height and length in inches for each different type of vehicle. This classification according to length and height is by way of example only and not to be limiting with respect to the invention.

|  | HEIGHT (Inches) | LENGTH (Inches) |
| --- | --- | --- |
| PICK-UP TRUCK | 3 | 216 |
| SURBURBAN PANEL TRUCK | 72 | 224 |
| FULL SIZE SEDAN | 58 | 231.5 |
| FULL SIZE STATION WAGON | 59 | 231.5 |
| INTERMEDIATE CAR | 58 | 218 |
| INTERMEDIATE STATION WAGON | 59 | 220 |
| COMPACT CAR | 55 | 200.5 |
| SUBCOMPACT CAR | 54 | 180 |
| VAN | 83 | 208 |

When the various terms, such as intermediate car, full size sedan and the like, are hereinafter used, it will be understood that they relate to vehicles having the general sizing range as above indicated. In each case where a vehicle loading is shown and described, it will be understood that a like arrangement may be made of vehicles of lesser height and length dimension as shown in the table above.

FIG. 7 shows the first of a number of loadings possible with the trailer 12. To clarify and simplify the explanation of the loading, the vehicles will be indicated in Roman numeral designation as shown on the drawing. In the loading arrangement of FIG. 7, it is a significant feature that the forward lower vehicle pick-up truck III is mounted on a pivotally movable track, namely track 34, so that the pick-up III actually spans longitudinally between the forward upper track 28 and the next lower track 36, which is largely seated in the bed of the trailer 12. This arrangement provides the best possible line-up between the several vertically arrayed pick-up trucks to provide the required clearance in the final loaded position. The front upper pick-up truck I is driven into place with suitable skids, such as the illustrated skid 46 shown in FIG. 1, to temporarily span the gap between the several tracks. Pick-up truck II is then backed onto track 30. The lower group of three tracks, namely tracks 34, 36 and 38, would be in their loading position, and the vehicle III would be loaded with track 34 then raised to its elevated position. The track 36 would be placed in its lowermost position. The vehicle IV would then be backed onto the track 36. Track 32 is prepositioned at its front end to allow clearance with the front of vehicle II and the rear end is pivotally moved down to permit the loading of vehicle V. The track 32 is then moved upwardly and vehicle VI is driven onto track 38. The particular loading most desirable will allow unloading of trucks, such as for example in the FIG. 7 drawing, II, III, IV and V in a forward facing position to make it possible to have available the use of headlights while unloading the trucks. It is possible to reverse the position of vehicles II and V should this be desired.

FIG. 8 shows a different vehicle load mix in which again the different vehicles are identified by Roman numerals to facilitate the explanation and to indicate the order in which they are loaded. The load in this case comprises three vans mounted on the upper three tracks, namely 28, 30 and 32, while two full-sized passenger sedans are loaded on the lower rearwardmost two tracks 36 and 38. In this case the lower two full-sized sedans are mounted at the lower deck proximate the bed of the trailer, while the greater height vans are necessarily mounted on the upper tracks 28, 30 and 32.

FIG. 9 shows a still different mixed loading of vehicles comprising a pair of vans and four full-sized sedans. In this case the loading is in the general order of loading the upper three tracks 28, 30 and 32 first, and then elevating the three upper tracks to an extreme upper position. Then the lower vehicles, in this case passenger full-sized sedans IV, V and VI, are driven in with their tracks appropriately aligned and with the upper tracks held in their highest possible position to provide adequate head clearance for the lower group of sedans. The track 34 is overlifted during loading of sedan V to provide clearance and finally lowered before the last lowering of upper tracks 28, 30 and 32. The track 36 is placed in its lowermost position while sedan V is being loaded. Then, as the final step preparatory to drive-away, the upper three tracks 28, 30 and 32 are lowered as far down as possible still maintaining the necessary head clearance for the load. In each case the loading process is facilitated and generally made possible through the pivotal arrangement of the forward lower track 34 and the pivotable movement of the upper rear track 32 further combined with its movement of translation into the upper loaded position.

FIG. 10 shows a further vehicle loading on a trailer in which six passenger sedans are transported on a self-contained trailer constructed in accordance with the present invention. In the loading for these vehicles, the front and center upper tracks 28 and 30 would first be raised to their uppermost height. The front of the rear upper track 32 would be lowered so that its front edge is in substantial alignment with the center upper track 30. A loading skid is then used to bridge the gap between the rearward end of the track 32 and the ground. Additionally, a jumper skid would be installed between the front upper track 28 and the middle track 30, and between the middle track 30 and the rearward upper track 32. Sedan I is then driven up onto the track 28. The skid is removed and the next vehicle II is driven onto the track 30. Finally, the third vehicle III is driven onto the upper track 32. The upper track 32 is elevated all the way up after the loading skid has been removed and stored, or held available for use in the loading of the lower deck. With all of the upper tracks 28, 30 and 32 fully elevated, the lower tracks are positioned, namely tracks 34, 36 and 38, so that the next three sedans can be driven onto the lower deck without bumping any of the upper track structures. Whenever possible, the vehicles are backed on to preserve the advantage of a forward unload. After vehicle IV is loaded, track 34 is overlifted to permit the loading of vehicle V and provide clearance. The track 36 is placed in its lowermost position while sedan V is being loaded. It is noted that vehicle IV in its loaded position has its rear wheels resting over the kingpin assembly of the trailer. Afterwards, the sedan VI is driven on and the loading skids are properly stored. Then the last step of the sequence would be to lower the upper deck tracks in the proper order to insure against damage of the vehicles I, II and III which they carry.

FIG. 11 shows a still different type of mixed commercial and passenger vehicle load which may be used with the present invention. This includes a pair of pick-up trucks, a van and four compact size cars. Again, the order in which the different vehicles are loaded is indicated by Roman numerals on each. With respect to the lower deck, there is provided a modification in its track which permits the carrying of a fourth compact car. The detail of this modification to the lower deck track is best shown in FIG. 12. The elevating mechanism and the construction of the upper three tracks 28, 30 and 32 are substantially the same as already described.

Instead of the single pivotable track 34 of FIG. 1, there is provided, as best shown in FIG. 12, a pair of tracks, namely a short pivotable track 110, adapted to support the forward wheels of the compact car IV, and a second pivotal track 112 for supporting the forward wheels of the vehicle V. Associated with the track 110 is its operating mechanism 114, including a cylinder 116 and a piston rod 118. The track 112 is movable from its upper dash line loading position to its lower loaded position through a first elevating mechanism 120 coupled to its left end and a second elevating mechanism 122 connected to its right hand end through a strut 123. Included in the elevating mechanism 120 is cylinder 124 and piston rod 126 together with the connecting cantilever link 128. In the solid line loaded position of the track 112, it will be seen that the cantilever 128 will swing down into the bed of the trailer and the track 112 will extend somewhat further rearwardly in the trailer.

Vehicles I, II and III are first loaded and then elevated to their uppermost position. Tracks 110 and 112 are aligned in their intermediate position. Vehicle IV is backed on and track 110 is raised to its elevated position. Track 112 is lowered and vehicle V is driven on. The rear end of track 112 is raised up to provide height clearance for vehicle VI. The forward edge of track 36 is lowered down and vehicles VI and VII are driven on. Finally, the upper tracks 28, 30 and 32 are placed in their lowered positions.

It will thus be seen that I have provided by my invention an improved vehicle transport trailer which allows increased capacity loading, all within the overall dimensional limits of a forty-five foot trailer, and makes possible the transport arrangement in which either standard tractors can be used, or, alternately, ramp modified tractors can be used.

What is claimed is:
1. A vehicle transport trailer for carrying a plurality of vehicles comprising:
   a pair of lower tracks mounted in the bed of the trailer;
   three upper elevatable tracks operable to be raised in the loaded condition to the upper position, the first upper track having its front end proximate the forward end of said trailer;
   a third lower track longitudinally spanning the first upper track and the next following lower track of said pair proximate the front of the trailer, said third lower track further longitudinally spanning the front two of said upper tracks;
   lifting means operably connected to the rear end of said third lower track for pivotally moving it between a lower loading position and an upper loaded position;
   lifting means operably connected to the rearmost of said upper tracks for lifting and expanding it rearwardly between a loading and a loaded position; and
   lifting means operably connected to each of the remainder of the aforesaid upper tracks for moving them between load and unload positions.

2. The combination as set forth in claim 1 wherein said lifting means for the rearmost of said upper tracks includes a pair of fluid operated cylinder and rod assemblies having their axes rearwardly inclined relative to the vertical direction.

3. The combination as set forth in claim 1 wherein said lifting means for the rearmost of said upper tracks includes a pair of hydraulically actuated cylinder and rod assemblies, pivotally mounted at their lower ends and both having their axes rearwardly inclined relative to the vertical direction.

4. The combination as set forth in claim wherein the mechanical clearance between the respective upper and lower tracks is sufficient to provide for a load of three full size sedans on said three lower tracks.

5. The combination as set forth in claim 4 wherein the overall height of said upper tracks is sufficient to allow for a load of full size sedans on each of said upper tracks.

6. The combination as set forth in claim 4 wherein the overall height of said upper tracks is sufficient to allow for a full sized sedan on the forwardmost of said upper tracks and a van on the rearward two of said upper tracks.

7. A vehicle transport trailer for transporting six pick-up trucks thereon, said trailer having three lower vehicle supporting tracks and three upper vehicle supporting tracks, each of said tracks adapted to support a pick-up truck, the forwardmost of said upper tracks having its front end proximate the forward end of said trailer, the forwardmost one of said lower vehicle tracks having its forward end vertically aligned beneath the forwardmost upper track and its rearward end overlapping the front end of the next following lower track, said forwardmost of said lower tracks further spanning the first two of the upper vehicle supporting tracks; lifting means operably connected to the rearwardmost of said upper tracks for lifting and at the same time expanding it rearwardly between a lower loading position and an upper loaded position; and lifting means operably connected to each of the other of the aforesaid upper tracks for moving them between an upper load and a lower unload position.

8. The combination as set forth in claim 7 wherein the forwardmost upper and the rearwardmost lower tracks each are operable to support a forwardly oriented pick-up truck and the other tracks are slanted downwardly and upwardly, respectively, with respect to the horizontal, each operable to support a rearwardly oriented pick-up truck.

9. The combination as set forth in claim 7 wherein said lifting means for said rearwardmost of said upper tracks comprises a first hydraulic rod and cylinder assembly pivotally mounted at its lower end and coupled to the forward end thereof and a second hydraulic rod and cylinder assembly pivotally mounted at its lower end and coupled to the rearward end thereof.

* * * * *